No. 875,979. PATENTED JAN. 7, 1908.
F. E. BOCORSELSKI.
MULTIPLE DRILLING MACHINE.
APPLICATION FILED FEB. 7, 1906.

2 SHEETS—SHEET 2.

Witnesses:

Inventor,
Frank E. Bocorselski,
by Wm. F. Bellows
Attorney.

UNITED STATES PATENT OFFICE.

FRANK E. BOCORSELSKI, OF SPRINGFIELD, MASSACHUSETTS.

MULTIPLE DRILLING-MACHINE.

No. 875,979.  Specification of Letters Patent.  Patented Jan. 7, 1908.

Application filed February 7, 1906. Serial No. 299,904.

*To all whom it may concern:*

Be it known that I, FRANK E. BOCORSELSKI, a citizen of the United States of America, and resident of Springfield, in the county of Hampden and State of Massachusetts, have invented certain new and useful Improvements in Multiple Drilling - Machines, of which the following is a full, clear, and exact description.

This invention relates to improvements in multiple spindle drilling machines in which the drill spindles are arranged on parallel axes and for individual or independent adjustments thereof.

The invention pertains more particularly to means for effecting the adjustment of the parts of the machine which carry the drill spindles; and also to improved means for the confinement of the spindle carrying parts in their adjusted positions.

The invention consists in combinations and arrangements of parts and the construction of certain of the parts all substantially as hereinafter fully described and set forth in the claims.

Figure 1:
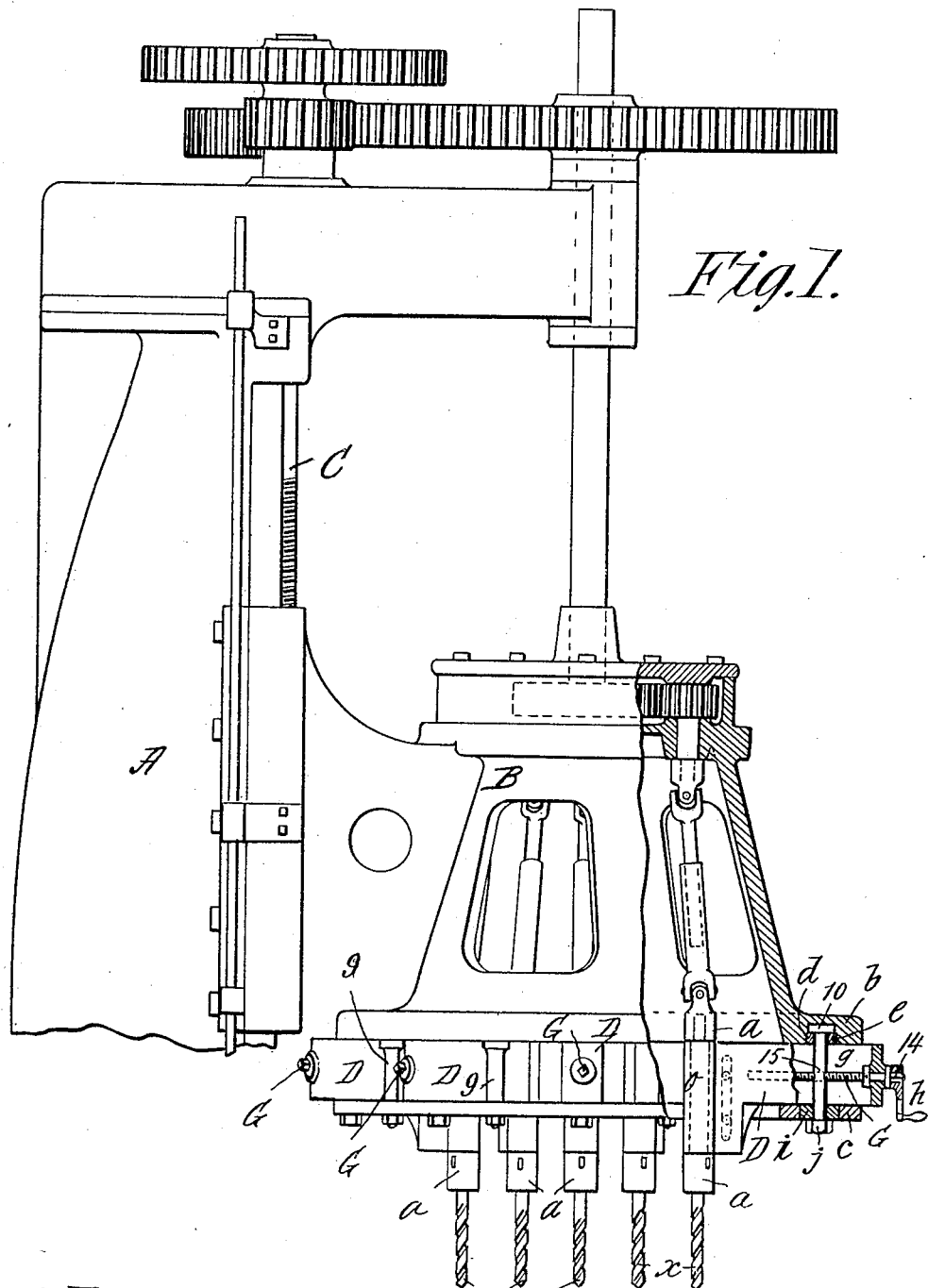
Figure 2:
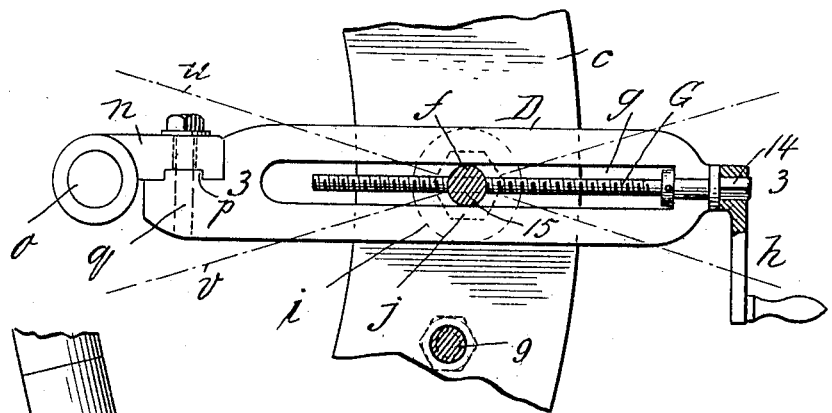
Figure 3:
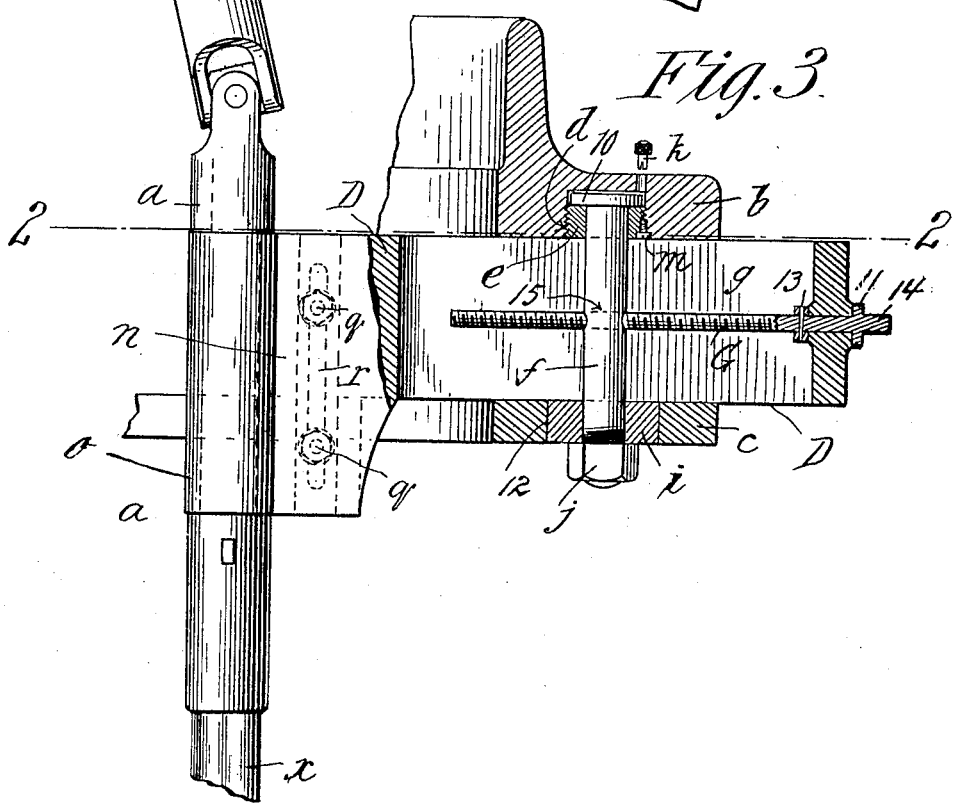

In the drawings,—Figure 1 is a side elevation of so much of a multiple spindle drilling machine as includes and shows the connection for operation thereon of the present improvements, a portion of the spindle carrying head being in vertical section. Fig. 2 is a plan view of a fragment of the head and showing the relation thereto of one of the drill spindle carrying arms and the mechanical adjusting means therefor. Fig. 3 is a sectional view on a vertical plane as taken on line 3—3, Fig. 2. The section line 2—2 on Fig. 3 indicates the plane below which are the parts shown in Fig. 2.

Similar characters of reference indicate corresponding parts in all of the views.

In the drawings,—A represents the standard or upright of the drilling machine on which the head B has a vertical movement as imparted by the feed screw C.

The head carries a plurality of arms D D which in turn carry, journaled vertically therein, the spindles or holders $a$ $a$ for the drills $x$, suitable driving connections as common, and comprising gearing, telescopic shafts and universal joints, being provided for rotating the drill spindles in whatever positions of adjustment the latter may have.

The head B comprises upper and lower separated circular or annular portions $b$ and $c$ rigidly connected by distance blocks or studs 9 at suitable intervals, and as is usual.

The upper circular portion $b$ is constructed with a circularly arranged series of downwardly open sockets $d$ within its under face; a series of studs $f$ having upper end heads 10 being fitted within said sockets and depending therebelow and through apertures 12 in the lower circular portion $c$ of the head. Threaded bushings $e$ are provided surrounding the studs adjacent the heads thereof and having screw engagement in said sockets for holding the studs in axially fixed positions, but leaving the studs free for rotary or swiveling movements on their respective axes.

It will be noted that these axes are fixed axes, since the sockets $d$ are independent, as distinguished, for instance, from mere portions of a continuous annular groove along which the heads of the studs would be free to travel.

The drill carrying arms having truly or approximately radial arrangements relatively to the circular portions of the head and holding the drill spindles, are located between the said circular head portions $b$ and $c$, are longitudinally slotted as shown at $g$ and embrace and are capable of inward and outward sliding engagements relatively to the aforementioned studs, and are also capable of swiveling movements on said studs.

G G represents threaded shafts or screws individually appurtenant to the respective spindle carrying arms, and as shown each screw shaft is journaled for rotation through the end portion of one of the arms at the outer boundary of the slot $g$ and is held against endwise movement relatively to the arm by the shoulder 11, and collar 13, and the outer end of the shaft is made square, as indicated at 14, for receiving the engagement thereon of a wrench crank $h$.

Each of the adjusting screws $g$ penetrates transversely, with a screw engagement, as indicated at 15, through an intermediate portion of the swivel stud $f$.

Within the apertures 12 in the lower circular portions $c$ of the head,—and through which apertures the lower extremities of the studs $f$ are extended,—are fitted washers $i$ (Fig. 3), the same embracing the studs and having bearing against the under sides or edges of the slotted arms D; and the screw threaded lower end portions of the studs receiving the clamping nuts *j*.

*k* in Fig. 3 indicates a lubricating shell of common kind applied for supplying oil between the head of the stud and the socket in which it is engaged for rotation.

*m*, Fig. 3, represents the set screw for preventing the loosening of the threaded bushing *e*.

The part *n* of the arm having the socket or journal *o* is made adjustable relatively to the arm proper having a rib and groove engagement therewith as represented at *p* in Fig. 2 and confined by bolts *q* passed through a slot *r* in the one part and screw engaging in tapped holes therefor in the other part of the arm.

By loosening the binding nut *j* for a given drill carrying arm, the arm is freed between the upper and lower circular portions *b* and *c* of the head, and the arm and its appurtenances may have rocking movements in a horizontal plane so as to be truly radial of the head or more or less inclined from the true radial line, as, for instance, on the lines such as represented at *u* and *v*, Fig. 2, the stud *f* being in a sense unitary with the arm; and by turning the adjusting screw *g* in the proper direction, the arm may have an inward or an outward movement relatively to the stud for positioning the drill spindle at any point, suitably distant as desired, from the center of the head.

It will be apparent that each arm may be quickly adjusted to a nicety, and the adjustment will be maintained without the liability of any changing thereof in the time intervening between the positioning of the arm and the final clamping thereof by the nut *j*.

In the foregoing description the improved devices have been described precisely as constructed for a vertical multiple parallel spindle drilling machine, but, of course, the same are equally well applicable on a machine in which the head is, or may be carried axially horizontal, and such terms in the foregoing description as "upper", "lower" and "under", "vertical" and "horizontal" are used in their relative sense, it being apparent that complete or partial inversion in the arrangements of the parts may be practiced in a manifest manner without fundamentally altering the character or capability of the mechanism.

I claim:—

1. In a multiple drilling machine, the combination with a circular head comprising separated rigidly connected circular portions, a series of studs having connections with one of said portions of the head and projecting through and beyond apertures which are provided therefor in the other head portion, of a series of longitudinally slotted drill supporting arms located between said separated circular portions of the head and having sliding engagements about said studs, washers fitted about the studs in said apertures of the one of said circular head portions, and adapted to engage with the several arms, and nuts, screw threading on the extremities of the studs, against said washers, and for crowding the arms to be bound against the stud carrying circular portion of the head.

2. In a multiple drilling machine, the combination with a head made with a circular portion having series of independent sockets within its under side, a series of studs having heads which are fitted rotatably within said sockets, and depend therebelow, and threaded bushings surrounding said studs adjacent their heads and screw engaged in said sockets, being adapted to sustain said studs and to permit rotation thereof, of a series of longitudinally slotted drill supporting arms located below said circular portion of the head and having sliding engagement on said studs, and means connecting the arms with the studs to rotate therewith.

3. In a multiple drilling machine, the combination with a circular head, having a plurality of independent sockets, studs mounted in said sockets for rotation but not for translation, and a plurality of drill supporting arms connected with said studs for longitudinal adjustment thereon and also to swing therewith into and out of radial position with reference to the head.

Signed by me at Springfield, Mass., in presence of two subscribing witnesses.

FRANK E. BOCORSELSKI.

Witnesses:
G. R. DRISCOLL,
WM. S. BELLOWS.